United States Patent [19]
van der Plaat

[11] Patent Number: 5,810,042
[45] Date of Patent: Sep. 22, 1998

[54] DEVICE FOR ENSURING THE SAFETY OF THE GAS AND OXYGEN SUPPLY TO A CUTTING AND WELDING TORCH, AND A FLOW-PRESSURE SWITCH FOR USE IN SAID DEVICE

[76] Inventor: Bastiaan van der Plaat, Saturnusstraat 7, 2957 HH Nieuw-Lekkerland, Netherlands

[21] Appl. No.: 782,017

[22] Filed: Jan. 7, 1997

[30] Foreign Application Priority Data

Jan. 11, 1996 [NL] Netherlands .......................... 1002062

[51] Int. Cl.$^6$ ........................................ F16K 11/10
[52] U.S. Cl. ................... 137/114; 137/111; 137/599; 137/606
[58] Field of Search ................. 137/111, 112, 137/113, 114, 599, 606, 110, 109, 101.21, 87.01

[56] References Cited

U.S. PATENT DOCUMENTS

| | | | |
|---|---|---|---|
| 1,213,159 | 1/1917 | Dalén | 137/114 X |
| 2,615,464 | 10/1952 | Hughey | 137/87.01 |
| 2,840,016 | 6/1958 | Chouinard et al. | 137/114 X |
| 3,805,819 | 4/1974 | Etter | 137/113 X |
| 4,827,965 | 5/1989 | Wates | 137/114 |

FOREIGN PATENT DOCUMENTS

| | | |
|---|---|---|
| 8126045.8 | 2/1982 | Germany . |
| 9006365.1 | 10/1990 | Germany . |
| 858818 | 1/1961 | United Kingdom . |

*Primary Examiner*—Stephen M. Hepperle
*Attorney, Agent, or Firm*—Brooks & Kushman P.C.

[57] ABSTRACT

A device for ensuring the safety of the oxygen and gas supply to a welding and cutting torch (4). The object of the device is to prevent accidental escape of oxygen and/or gas when the torch is not in use. For this purpose, the device is characterized in that the oxygen supply line and the gas supply line each contain a controlled regulating valve (10, 12), which valves are connected to a common control line (14). The oxygen supply line, downstream of the regulating valve (12), viewed in the direction of flow of the oxygen, contains a starting tank (20), and a flow-pressure switch (21) which operates a regulating slide valve (16) accommodated in the control line, said control line being in communication by way of the regulating slide valve and a line (30) with the part of the oxygen supply line situated upstream of said regulating valve (12).

The invention is also embodied in a flow-pressure switch, which is suitable in particular for use in the above device.

10 Claims, 3 Drawing Sheets

DEVICE FOR ENSURING THE SAFETY OF THE GAS AND OXYGEN SUPPLY TO A CUTTING AND WELDING TORCH, AND A FLOW-PRESSURE SWITCH FOR USE IN SAID DEVICE

BACKGROUND OF THE INVENTION

The present invention relates to a device for ensuring the safety of the gas and oxygen supply to a cutting and welding torch of the type generally used in workshops and shipyards. The invention also relates to a flow-pressure switch which can be used in such a device. Such a safety means is intended in particular for preventing oxygen and/or gas from escaping from the torch for one reason or another when said torch is not in use.

A welding or cutting torch generally has a gas cock which is connected to a gas supply line, and two oxygen cocks which are connected to a supply line for oxygen. One oxygen cock supplies so-called preheating oxygen for the welding, and the second oxygen cock supplies cutting oxygen which is not mixed with the gas, but is conveyed direct to the torch mouth as additional oxygen during the flame cutting. The supply lines are generally rubber hoses which run from the torch to a gas distribution block, usually situated several tens of metres away. In the case of the known torches there is a risk that one of the cocks may be opened accidentally, as a result of which gas can escape, with all the consequent risks of such an occurrence. In the case of torches operating by vacuum a safety valve is generally fitted in the gas supply line and opens only if the oxygen flowing out of the torch causes a vacuum in said line. This safety means ensures that users of the torch shut off only the oxygen cock and generally leave the gas cock open after they have finished their work. This can result in dangerous situations if the oxygen cock on the torch is opened accidentally, since a combustible mixture will then flow out of the torch, which produces the risk of explosions. The safety devices known until now are in fact limited to the gas supply, while no means are present for preventing the accidental escape of oxygen or for warning the user if an oxygen leak has occurred.

SUMMARY OF THE INVENTION

A first object of the invention is to provide a device for ensuring the safety of the oxygen supply to the welding and cutting torch, in the case of which the gas supply line has already been provided with a known safety valve.

A further object is to provide a device for ensuring the safety of the oxygen supply to a welding and cutting torch which is reliable and is cheap to produce, and where the user putting the torch into operation is automatically made aware of the fact that an oxygen leak has occurred.

These objects are achieved according to the invention by means of a device which has the features specified in Claim 1. The fact that the flow-pressure switch is set in such a way that the system is put into operation only when both oxygen cocks are opened means that a safety means is obtained, since there is virtually no chance of such opening occurring accidentally. When there is an oxygen leak, only the starting tank empties, so that the user is obliged to operate the manual regulating slide valve first, before the system can be restarted.

Another object is to provide a device for ensuring the safety of both the oxygen supply and the gas supply to the torch. This object is achieved by means of a device with the features described in Claim 2. This device has the advantage that no other safety valves are necessary, while this device can function efficiently irrespective of whether or not the torch is operating with vacuum in the gas supply line. Claim 3 describes an advantageous further development of this embodiment, in which a starting tank with flow-pressure switch is fitted both in the oxygen supply and in the gas supply.

Claims 4 and 5 describe efficient variants and further developments of the present invention.

The invention is also embodied in a flow-pressure switch which can be used advantageously in the safety device according to the invention. Said flow-pressure switch must be capable of switching over a regulating slide valve depending on the gas flow supplied through said switch, which switch for safety reasons must not use electrical current. This last object is achieved according to the invention by means of a switch which has the features described in Claim 6.

Claims 7–10 give further details of the flow-pressure switch according to the invention.

The invention is explained in greater detail with reference to the drawing, in which:

DETAILED DESCRIPTION OF THE DRAWINGS

Figure 1:
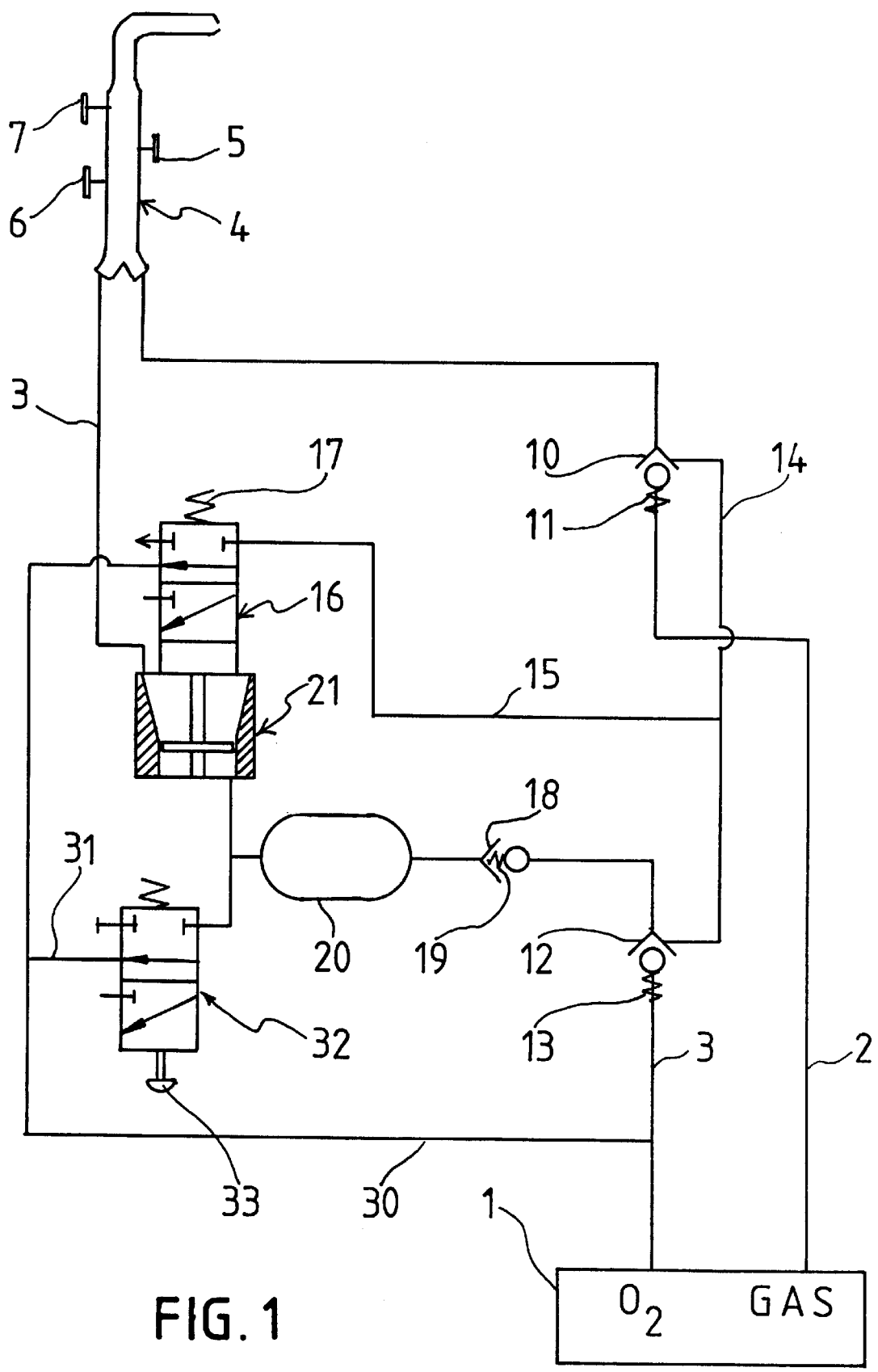
FIG. 1 shows a schematic diagram of the device according to the invention.

The drawing shows in FIG. 1 by reference number 1 a distribution block, from which a gas supply line 2 and an oxygen supply line 3 run to a welding cutting torch 4. The torch is of a conventional type, having a gas cock 5 and two oxygen cocks 6 and 7. In this case reference number 6 indicates the preheating oxygen cock, and number 7 the cutting oxygen cock.

A controlled non-return valve 10, which is normally held in the closed position by a spring 11, is fitted in the gas line 2. An identical controlled non-return valve 12, which is normally held in the closed position by a spring 13, is fitted in the oxygen line 3. This means that the two non-return valves 10 and 12 are constantly in the closed position and are connected to a common control line 14, which is connected by way of a line 15 to a regulating slide valve 16. Said regulating slide valve 16 is a two-position slide valve which is pressed by a spring 17 into the position shown, in which position the line 15 is in open communication with the environment (i.e. it is pressureless). In the other position of the regulating slide valve 16 the line 15 is in communication with an oxygen line which is under pressure, and which will be described below. The regulating slide valve 16 is operated by a flow-pressure switch 21, which will be discussed in detail below with reference to FIG. 2. For a good understanding of the device, it is sufficient here to know that the flow-pressure switch switches the regulating slide valve from the closed position into the open position when a predetermined quantity of oxygen flows through the switch, and switches the regulating slide valve back again when the quantity of oxygen falls below a predetermined value.

The oxygen line 3 further has a non-return valve 18, which is normally held in the open position by a spring 19.

Said non-return valve 18 serves as a hose breakage safety means. If the oxygen supply line breaks or is accidentally severed downstream of this valve, such a great oxygen flow occurs that the ball of the valve is pressed against the pressure of the spring 19 and closes the valve.

A starting tank 20 is accommodated in the oxygen line, between the non-return valve 18 and the flow-pressure switch 21, which starting tank is normally filled with oxygen, and the function and the operation of which will be discussed later. From the starting tank 20 the oxygen line runs by way of the flow-pressure switch 21 to the torch 4.

Between the distribution block 1 and the non-return valve 12 the oxygen line has a bypass line 30, which is connected to the regulating slide valve 16. Said bypass line 30 in turn has a branch line 31, which is connected to the oxygen line 3, to the part thereof which is situated between the starting tank 20 and the flow-pressure switch 21. Finally, a manually operated switch slide valve 32 is accommodated in the branch line 31, which valve normally shuts off said branch line 31 and can be opened by pressing a control button 33 by hand.

The operation of the diagram illustrated is as follows:

Starting from the initial position shown in the drawing, in which both valves 10 and 12 are closed, the valve 18 is open, both regulating slide valves 16 and 32 are closed, and the starting tank 20 is filled with oxygen under pressure. An operative who wishes to start to work with the torch 4 first opens the gas cock 5. Nothing happens yet, since the gas supply is shut off by the valve 10. The operative then opens both oxygen cocks 6 and 7, as a result of which a large volume flow of oxygen flows out of the starting tank 20 and through the flow-pressure switch 21 to the torch. Said volume flow is sufficiently great to activate the switch 21 in such a way that it switches over the regulating slide valve 16 to the open position. This allows oxygen to flow by way of the bypass line 30 and the regulating slide valve 16 into the control lines 14 and 15. The oxygen pressure in the line 14 causes both valves 10 and 12 to be opened virtually simultaneously, so that a gas flow to the torch starts, and the oxygen stream also flows by way of the valves 12 and 18, the starting tank 20 and the flow-pressure switch 21 to the torch. The operative can ignite the torch and then close the cutting oxygen cock 7 if desired.

The flow-pressure switch 21 is set in such a way that a greater volume flow of oxygen is needed for changing over the regulating slide valve 16 from the closed to the open position than for holding it in the open position. This means that for putting the torch into operation both oxygen cocks must be opened, in order to provide this adequate volume flow. This provides additional safety, since accidentally opening one of the two oxygen cocks cannot result in the system being switched on. In this case the oxygen will only escape from the starting tank 20, without the valves 10 and 12 being opened. The starting tank 20 has a capacity of approximately two litres, so that it cannot endanger the environment if its contents run out.

If the starting tank 20 is empty for some reason or other, the system cannot be started by opening the two oxygen cocks. If the operative notices that opening of the oxygen cocks produces no result, he or she knows that the starting tank 20 is empty and that an oxygen leak has therefore occurred. A check can then be made to establish where this leak has occurred, and the leak can be repaired.

For restarting the system after this, it is necessary for the operative to hold down the control button 33 of the regulating slide valve 32 with the hand for some time, so that the starting tank 20 can fill with oxygen by way of the lines 30 and 31. After this, the torch can be put into operation again in the manner described above.

The device shown in FIG. 1 provides a safety means for both the oxygen supply and the gas supply. If the gas supply has already been provided with a conventional safety valve, the device according to the invention can also be fitted on the oxygen supply alone. In this case the control line 15 is connected directly to the regulating valve 12, and the regulating valve 10 with the control line 14 becomes superfluous.

Figure 2:
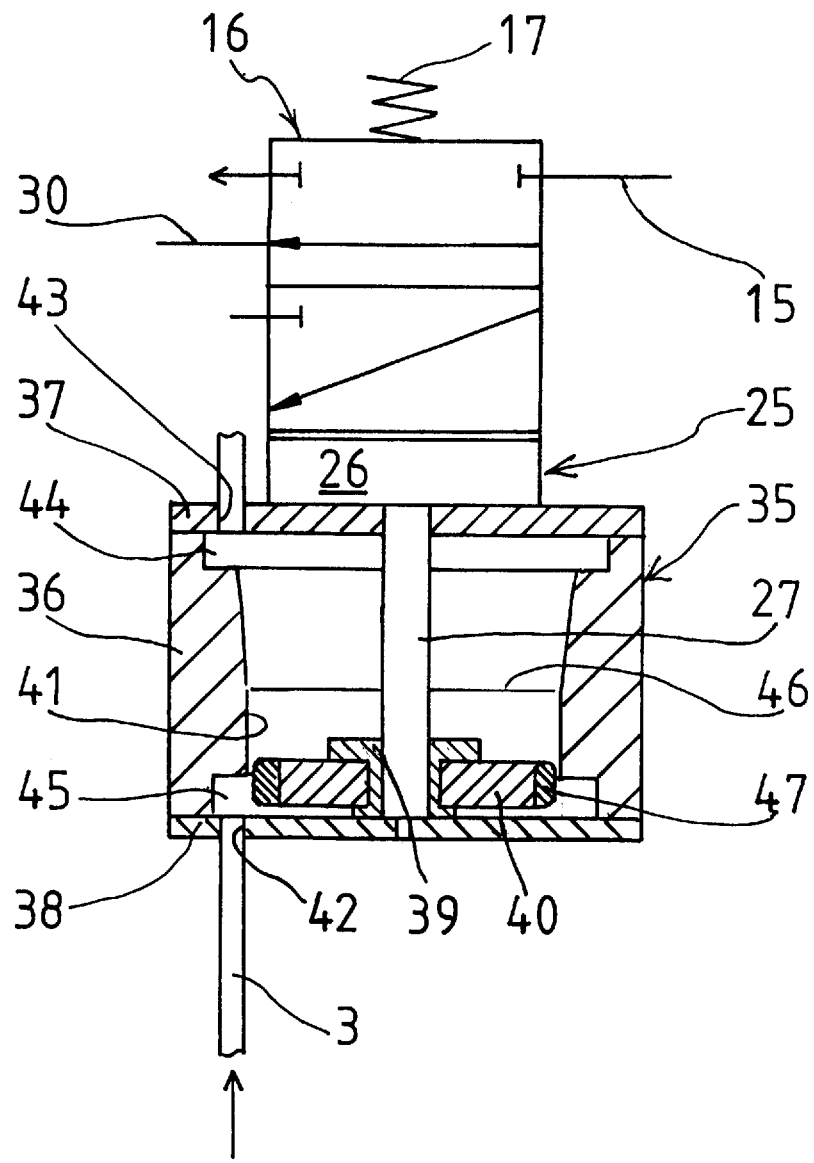
FIG. 2 shows on a larger scale a schematic section of the flow-pressure switch from the diagram of FIG. 1.

The flow-pressure switch 21 from FIG. 1 is shown on a larger scale in FIG. 2. Said flow-pressure switch is connected to a conventional regulating slide valve 16, which is provided with a likewise conventional electromagnetic switch 25. The electromagnetic switch consists of a block 26 which is fitted immovably on the regulating slide valve and has a projecting tube 27. A plunger, which is not visible in the drawing, is fitted movably in said tube, and the movement of said plunger produces the actual switching operation. In the case of the conventional electromagnetic switch said plunger is operated by exciting or not exciting an electric coil fitted around the tube 27.

The invention is therefore based on the idea of using this conventional electromagnetic switch as a flow-pressure switch.

As can be seen from FIG. 2, the tube 27 is accommodated in a cylindrical housing 35, and the axis of the tube coincides with the axis of said housing. The housing consists of a cylindrical wall 36 and two end walls 37 and 38 which bound a cylindrical interior space of the housing and are situated at right angles to the axis of the housing 35. A sliding sleeve 39, bearing an annular permanent magnet 40, is fitted around the tube 27, in such a way that it is freely slidable in the interior space of the housing.

The arrangement is as shown in FIG. 2, i.e. the tube 27 is directed vertically and runs from the block 26 down through an opening in the top end plate 37 into the interior space of the housing, and lies with the free end sealed off by means of an O-ring (not visible) against the bottom end wall 38. The outer periphery of the annular permanent magnet 40 lies with slight play away from the inner surface 41 of the cylindrical wall 36, and can therefore move as a freely movable piston vertically along the tube 27. The oxygen can enter the interior space of the housing by way of an opening 42 in the bottom end wall 38, and leaves the interior space by way of an opening 43 made in the top end wall 37. On both parts adjoining the end walls, the inner surface 41 of the wall 36 is provided with an annular recess 44, 45 respectively, which recesses each form a local annular radial widening of the interior space. Said openings 42 and 43, to which the oxygen line 3 is connected, are situated in the region of the respective end walls adjoining said recesses 44 and 45.

The regulating slide valve 16 and the switch block 26 with the tube 27 are commercially available parts and will not be discussed in any further detail here. For a good understanding of the operation of the flow-pressure switch according to the invention, it is important to know that the tube 27, as already mentioned, contains a plunger (not shown in the drawing) which is movable in the axial direction therein. However, the movement of this plunger is produced here by moving the permanent magnet along the tube 27. Said movement in turn causes the regulating slide valve to be switched over, in such a way that if the magnet moves up from the rest position shown, the regulating slide valve is switched over from the closed position shown to the open position, while in this example the line 15 enters into communication with the bypass line 30.

As shown in an exaggerated manner in FIG. 2, the inner surface 41 of the wall 36 from the bottom end plate over some distance upwards has a uniform diameter, and only a few tenths of millimetres' play is present between the permanent magnet and this surface. After this, the inner surface runs slightly tapering towards the outside (e.g. from the line 46 onwards), so that the play between the magnet and the above mentioned inner surface becomes greater as the magnet moves further upwards. The angle at which said inner surface widens is approximately 1°–2°, and must in any case be sufficient, on the one hand, in the highest position of the magnet to provide a sufficiently large passage for the maximum volume flow of oxygen and, on the other hand, to provide an adequate flow to keep the magnet in the up position.

The operation of the flow-pressure switch is then as follows:

If oxygen is supplied by way of the line 3 and the opening 42 into the interior space of the housing 35, the permanent magnet will initially be pressed upwards by the oxygen pressure. The annular recess 45 in this case gives a uniform distribution of the oxygen around the periphery of the magnet. As a result of this upward movement, the magnet will go beyond the switch point at a particular moment, so that the regulating slide valve is switched over from the closed position to the working position. This switch point can lie, for example, in the region where the internal surface widens. The magnet will initially be moved upwards by the pressure of the oxygen and will then remain suspended in the oxygen stream in the broadened region. It will be clear that at a given weight and surface area of the permanent magnet a certain volume flow and pressure are necessary to activate the switch. By adapting the weight and surface area of the permanent magnet, the volume flow of the oxygen at which the switch goes into operation can thus be determined. If said volume flow falls below a predetermined value, the magnet will drop by its own weight and switch back the switch again. The value of the volume flow for switching on need not be the same as for switching back. In order to adapt the weight and the surface area of the permanent magnet, a ring 47 made of plastic or another suitable material can be fitted around the external periphery thereof. According to the invention, this produces a contactless flow-pressure switch which, in addition to the application described above, can also be applied in many other areas, in particular where the use of electrical current is not possible, on account of the risk of explosion.

When it is used in the safety device described with reference to FIG. 1, the weight and the surface area of the permanent magnet are such that said magnet can move upwards over the switch point only if both the preheating oxygen cock 6 and the cutting oxygen cock 7 are open. If after the torch has been ignited the cutting oxygen is switched off, the magnet will sink slightly by its own weight, but it will in any case remain suspended above the switch-off point. Only if the preheating oxygen cock 6 is also turned off, will the magnet pass the switch-off point, with the result that the regulating slide valve 16 is switched over, the lines 14 and 15 become pressureless, and the valves 10 and 12 are closed, following which the entire system is switched off.

Figure 3:
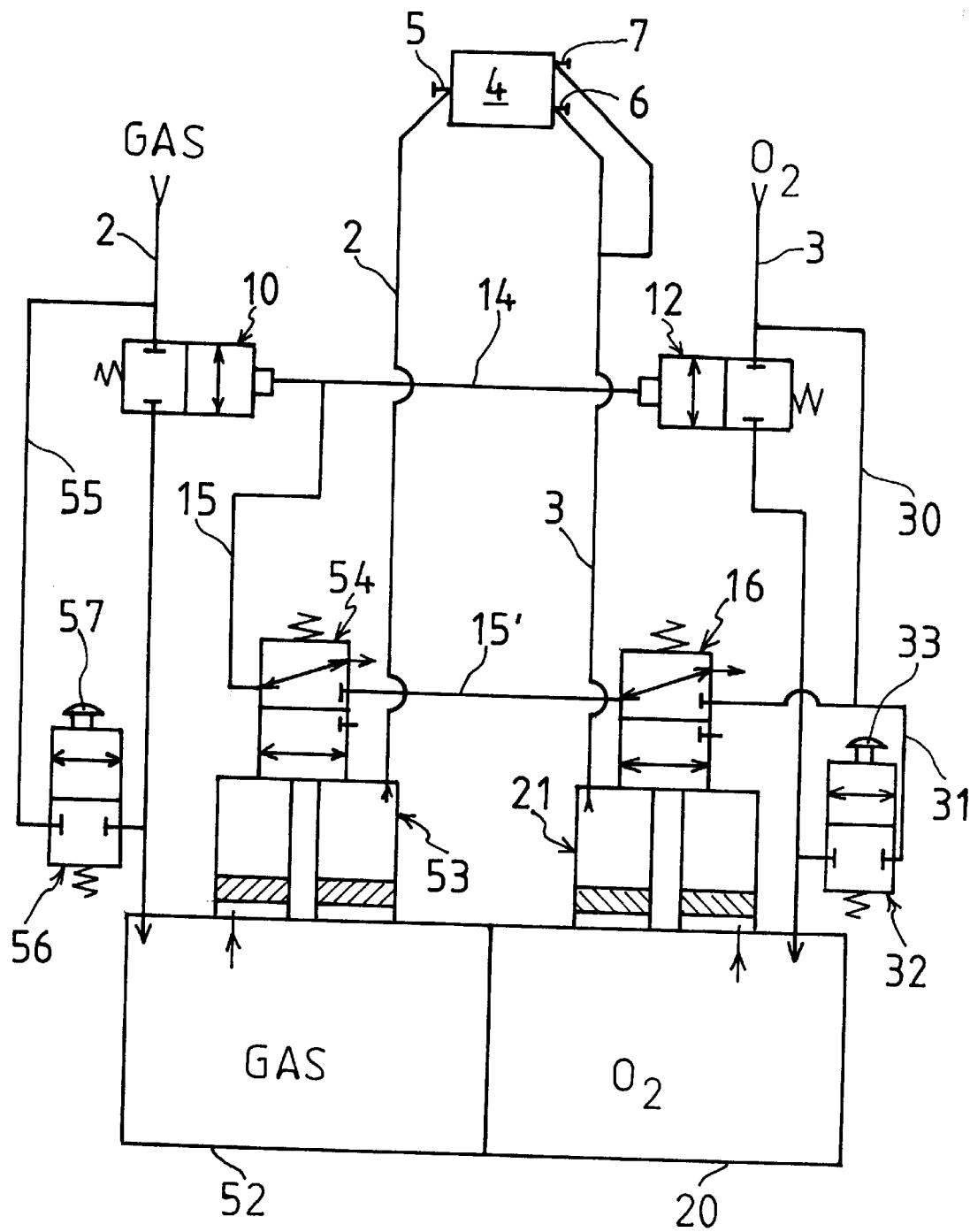
FIG. 3 shows a diagram of an embodiment in which a starting tank is fitted both in the oxygen supply and in the gas supply.

Yet another embodiment of the device for ensuring the safety of both the gas and the oxygen supply to a torch is shown diagrammatically in FIG. 3. In this diagram the same reference numbers as those in FIG. 1 are used as far as possible.

The oxygen is supplied by way of the line 3, while the gas is supplied by way of line 2. Regulating valves 10 and 12, which in fact operate in the same way as the controlled non-return valves 10 and 12 in FIG. 1, are fitted in the lines 2 and 3 respectively. The two valves 10 and 12 are normally in the closed position and can be opened jointly by placing the control line 14, 15 under pressure. In the oxygen line 3 the starting tank 20 is again accommodated downstream of the valve 12, while in the gas line 2 a starting tank 52 is fitted downstream of the valve 10. Each starting tank is connected to a flow-pressure switch 21 and 53 respectively, which are each again in communication with a regulating slide valve 16 and 54 respectively, and can switch over the latter from the closed to the open position.

The gas line 2 is provided with a bypass line 55 running around the valve 10, and in which a manually operated switch slide valve 56 which has a control button 57 is accommodated. The oxygen line 3 is again provided with a bypass line 30 running around the valve 12 and is connected to the regulating slide valve 16. The bypass line 30 has a branch line 31, which opens out in the starting tank 20. The manually operated slide valve 32 with control button 33 is accommodated in this branch line. The bypass line 30 continues downstream of the regulating slide valve 16 in the control line 15', which is connected by way of the regulating slide valve 54 to the control line 15. The control line 15 is thus in communication with the bypass line 30 by way of the two regulating slide valves 54 and 16, which are placed in series. This means that the control line 14, 15 can come under pressure of oxygen and the system can be started only if the two regulating slide valves 16 and 54 are in the open position.

The embodiment described here works as follows:

The system is at pressure, i.e. both starting tanks 52 and 20 are under pressure (are filled). The main valves 10 and 12 are closed, and the control lines 14, 15 are pressureless, because both regulating slide valves 16 and 54 are closed. The gas cock 5 and the oxygen cock 6 of the torch 4 are opened, and a starting pulse is given by opening the cutting oxygen cock 7. This means that gas flows out of the starting tank 52 through the flow-pressure switch 53 to the torch 4, so that the regulating slide valve 54 is opened and the control line 15' is connected to the control line 15. Opening the cock 7 causes sufficient oxygen for operating the regulating slide valve 16 to flow out of the starting tank 20 to the torch, so that the control line 15' is connected to the bypass line 30. The fact that the two valves 54 and 16 are switched over means that the control line 14 is now connected to the oxygen supply 3, and the two valves 10 and 12 are opened, so that the oxygen and gas can be supplied to the torch by way of the respective starting tanks and flow-pressure switches. Therefore, owing to the fact that the two regulating slide valves 54 and 16 are placed in series, both the gas cock 5 and the oxygen cocks 6 and 7 have to be opened in order to start up the system. If one or more of the cocks on the torch is closed, the flow through the respective flow-pressure switches will be inadequate, and the regulating slide valves 54 and/or 16 will make the control line 14 pressureless, with the result that the two valves 10 and 12 are closed. If a leak has occurred and one or both starting tanks are pressureless, the operative must depress the control button 33 and/or 57 to bring the starting tanks under pressure again, in order to be able to start up the system.

It will be clear that the invention is not restricted to the embodiments described and illustrated here, but that within the scope of the appended claims a large number of modifications can be made, depending on the specific use.

What is claimed is:

1. A device for ensuring the safety of the oxygen and gas supply to a welding and cutting torch (4), which torch has a gas cock (5) which is connected to a gas supply line (2), and has a preheating oxygen cock (6) and a cutting oxygen cock (7), which are both connected to an oxygen supply line (3), while the gas supply line is provided with a safety valve, wherein the oxygen supply line contains a controlled regulating valve (12) which is connected to a control line (14, 15), and downstream of the regulating valve (12), viewed in the direction of flow of the oxygen, contains a regulating slide valve (16) which is operated by a flow-pressure switch (21), while the control line (14, 15) is in communication by way of the regulating slide valve (16) with a bypass line (30) running around the regulating valve (12);

in that a starting tank (20) is fitted in the oxygen supply line, in the region between the regulating valve (12) and the flow-pressure switch (21); and in that a manually operated regulating slide valve (32) is fitted, accommodated in a branch line (31) connecting the bypass line (30) to the starting tank (20).

2. A device for ensuring the safety of the oxygen and gas supply to a welding and cutting torch (4), which torch has a gas cock (5) which is connected to a gas supply line (2), and has a preheating oxygen cock (6) and a cutting oxygen cock (7), which are both connected to an oxygen supply line (3), wherein the oxygen supply line and the gas supply line each contain a controlled regulating valve (12, 10 respectively) which are connected to a common control line (14, 15);

downstream of the regulating valve (12), viewed in the direction of flow of the oxygen, the oxygen supply line contains a regulating slide valve (16) which is operated by a flow-pressure switch (21), while the control line (14, 15) is in communication by way of the regulating slide valve (16) with a bypass line (30) running around the regulating valve (12);

a starting tank (20) is fitted in the oxygen supply line in the region between the regulating valve (12) and the flow-pressure switch (21); and a manually operated regulating slide valve (32) is fitted, accommodated in a branch line (31) connecting the bypass line (30) to the starting tank (20).

3. A device according to claim 2, wherein downstream of the regulating valve (10), viewed in the direction of flow of the gas, the gas supply line contains a regulating slide valve (54) operated by a flow-pressure switch (53) while the control line (14, 15) is in communication by way of the regulating slide valve (54) and the regulating slide valve (16) with the bypass line (30) running around the regulating valve (12);

a starting tank (52) is fitted in the gas supply line, in the region between the regulating valve (10) and the flow-pressure switch (53); and a manually operated regulating slide valve (56) is fitted, accommodated in a bypass line (55) running around the regulating valve (10) and opening out into the starting tank (52).

4. A device according to claim 3, wherein the regulating slide valve (16) is switched over by the flow-pressure switch (21) from the closed rest position into the open working position when the two oxygen cocks (6, 7) are opened, and remains in this working position when the cutting oxygen cock (7) is closed, and switches back again to the closed position when the preheating oxygen cock (6) is also closed.

5. A device according to claim 3, wherein each of the starting tanks (20, 52) has a capacity of approximately two litres.

6. A flow-pressure switch, in particular for use in the device according to any one of the preceding claims 1–5, comprising a control block (26) which is to be connected to a regulating slide valve and has a tube (27) in which an electromagnetically operated switch element is accommodated, characterized by an annular permanent magnet (40) which can be slid freely around the tube and is surrounded with some play by a cylindrical wall (36) which is disposed coaxially around said tube and extends over the full length of the tube, and which is closed at the ends by end walls (38, 37) which are provided respectively with a supply opening (42) and a discharge opening (43) for a gas, while the wall (36) is disposed essentially vertically, and the play between the magnet (40) and the inner surface (41) of said wall increases towards the top.

7. A flow-pressure switch according to claim 6, wherein the inner surface (41) of the wall (36) from the underside has a first part with a uniform diameter, and then has a second part which widens at an angle of 1°–2°.

8. A flow-pressure switch according to claim 7, wherein at the regions adjoining the end walls (38, 37) the inner surface (41) is provided with annular recesses (44, 45), and the supply opening (42) and the discharge opening (43) for gas are situated in the respective regions of the end walls bounding said recesses.

9. A flow-pressure switch according to claims 6, wherein a ring (47) made of a plastic material is fitted around the outer periphery of the permanent magnet (40).

10. A flow-pressure switch according to claim 7, wherein the permanent magnet in the above mentioned first region with uniform diameter has a play of several tenths of a millimetre between it and the inner surface (41) of the wall (36).

* * * * *